United States Patent [19]

Swain et al.

[11] Patent Number: 5,520,399
[45] Date of Patent: May 28, 1996

[54] CHUCK ASSEMBLY

[75] Inventors: Eugene A. Swain, Webster; Geoffrey M. T. Foley, Fairport, both of N.Y.

[73] Assignee: Xerox Corporation, Stamford, Conn.

[21] Appl. No.: 338,062

[22] Filed: Nov. 14, 1994

[51] Int. Cl.⁶ .......................... B05C 13/02; B23B 31/40
[52] U.S. Cl. .................. 279/2.15; 118/503; 269/48.1; 279/2.21; 294/94
[58] Field of Search .................. 279/2.12, 2.14, 279/2.15, 2.21, 2.22, 123, 157, 67; 242/571, 571.8, 572, 573, 573.1; 198/803.12; 294/93, 94, 99.1, 100; 118/500, 503; 269/48.1

[56] References Cited

U.S. PATENT DOCUMENTS

| | | | |
|---|---|---|---|
| 581,209 | 4/1897 | Hughes | 279/2.21 |
| 3,747,945 | 7/1973 | Bailiff | 279/123 |
| 3,777,875 | 12/1973 | Sobran | 198/131 |
| 3,909,021 | 9/1975 | Morawski et al. | 279/2 R |
| 3,945,486 | 3/1976 | Cooper | 198/179 |
| 3,997,176 | 12/1976 | Wyckoff et al. | 242/573 |
| 4,680,246 | 7/1987 | Aoki et al. | 430/133 |
| 4,783,108 | 11/1988 | Fukuyama et al. | 294/98.1 |

*Primary Examiner*—Steven C. Bishop
*Attorney, Agent, or Firm*—Zosan S. Soong

[57] ABSTRACT

There is disclosed a chuck assembly for engaging the inner surface of a hollow substrate comprising: (a) a fluid impermeable elastic membrane including a substrate engaging portion, wherein the inner surface of the membrane defines an interior space; and (b) a plurality of radially movable members at least partially disposed in the interior space, wherein the membrane is dimensioned to provide a radially inward force on the members, wherein the members in a radially expanded position push the substrate engaging portion of the membrane against the substrate inner surface, and wherein the peripheral dimension of the elastic membrane decreases when the members are in a radially contracted position.

12 Claims, 4 Drawing Sheets

CHUCK ASSEMBLY

This invention relates generally to an apparatus for internally holding a substrate such as a drum or a belt for processing. More specifically, the invention relates to a chuck assembly employing radially movable members and an elastic membrane which is fitted over the members.

Conventional substrate holding devices grip the insides of a hollow substrate by using for example an inflatable member. Known gripping devices are illustrated by the following documents, several of which disclose an inflatable member: Fukuyama et al., U.S. Pat. No. 4,783,108; Aoki et al., U.S. Pat. No. 4,680,246; Cooper, U.S. Pat. No. 3,945,486; and Sobran, U.S. Pat. No. 3,777,875.

Morawski et al., U.S. Pat. No. 3,909,021, discloses a collet chuck for gripping the bore of a workpiece. The chuck has an axially slotted outer expandable work-gripping sleeve and an inner collet expander. The sleeve and expander are relatively axially shiftable to expand and contract the sleeve. The slots are filled with an elastomer and the open end of the sleeve has a rubber cap thereon, the elastomer filled slots and the rubber cap preventing the ingress of dirt, chips, and the like into the work-gripping sleeve.

There is a need, which the present invention addresses, for new apparatus for internally gripping a hollow substrate which is simple and economical to implement.

SUMMARY OF THE INVENTION

It is an object of the invention in embodiments to provide a new apparatus for internally gripping a hollow substrate which is simple and economical to implement.

These objects and others are accomplished in embodiments by providing a chuck assembly for engaging the inner surface of a hollow substrate comprising:

(a) a fluid impermeable elastic membrane including a substrate engaging portion, wherein the inner surface of the membrane defines an interior space; and (b) a plurality of radially movable members at least partially disposed in the interior space, wherein the membrane is dimensioned to provide a radially inward force on the members, wherein the members in a radially expanded position push the substrate engaging portion of the membrane against the substrate inner surface, and wherein the peripheral dimension of the elastic membrane decreases when the members are in a radially contracted position.

In embodiments of the present invention, there is also provided a chuck assembly for engaging the inner surface of a hollow substrate comprising:

(a) a fluid impermeable elastic membrane including a substrate engaging portion, wherein the inner surface of the membrane defines an interior space; and (b) a plurality of circumferentially arranged and radially movable members at least partially disposed in the interior space, wherein adjoining members overlap and contact one another in the overlapping area, wherein the membrane is dimensioned to provide a radially inward force on the members, wherein the members in a radially expanded position push the substrate engaging portion of the membrane against the substrate inner surface, and wherein the peripheral dimension of the elastic membrane decreases when the members are in a radially contracted position.

BRIEF DESCRIPTION OF THE DRAWINGS

Other aspects of the present invention will become apparent as the following description proceeds and upon reference to the Figures which represent preferred embodiments.

Unless otherwise noted, the same reference numeral in the Figures refers to the same or similar feature.

DETAILED DESCRIPTION

Figure 1:
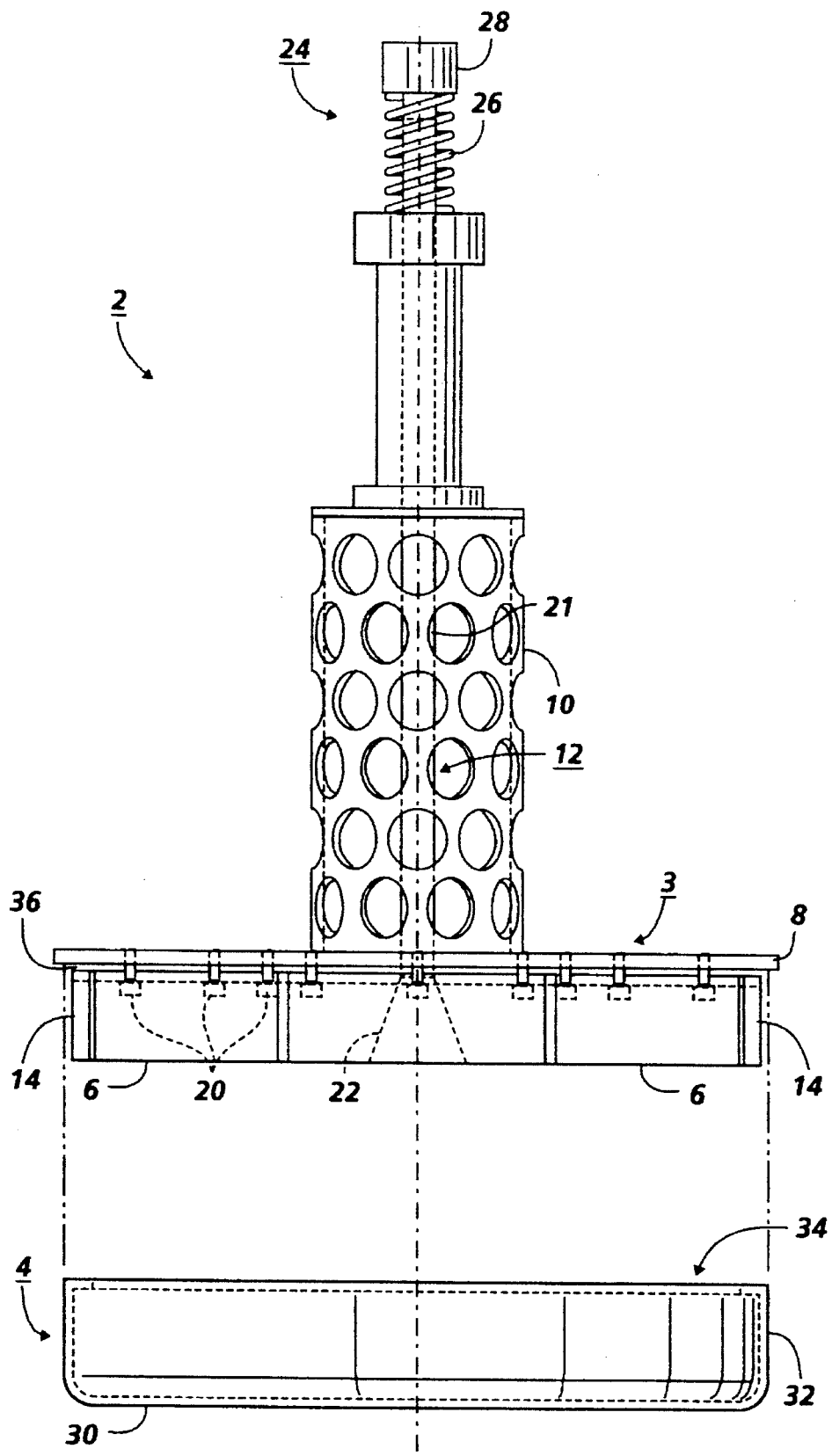
FIG. 1 represents a schematic, side view of the chuck assembly comprised of the chuck and the elastic membrane.
Figure 2:
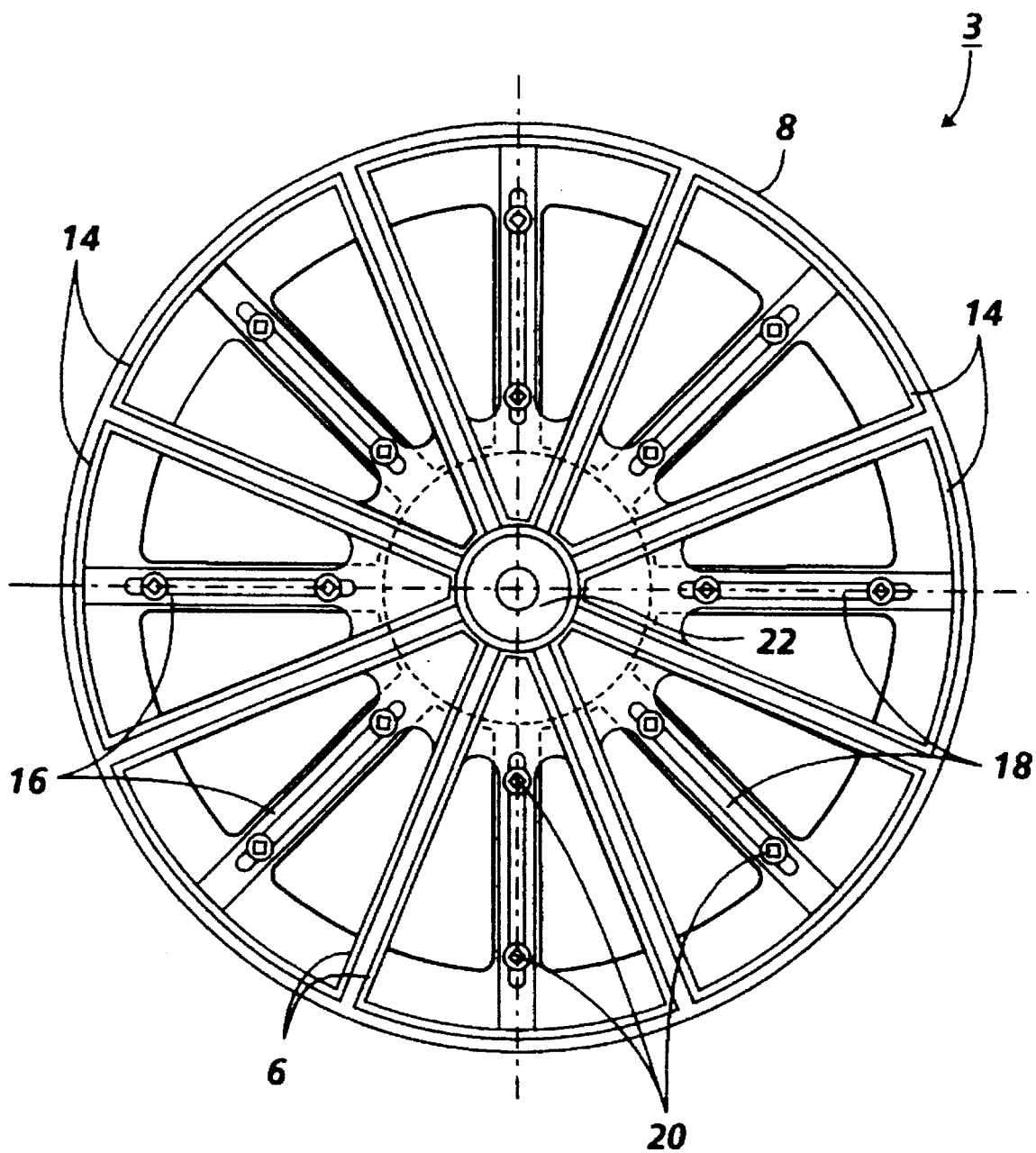
FIG. 2 represents a bottom view of the chuck depicted in FIG. 1.

FIGS. 1 and 2 illustrate one embodiment of the instant invention where chuck assembly 2 is comprised of chuck 3 and a fluid impermeable elastic membrane 4. The chuck 3 is comprised of a plurality of radially movable members 6, plate 8, housing 10, and means 12, operatively associated with the members 6, for moving substantially simultaneously the members into a radially expanded position.

The members 6 are preferably triangularly-shaped and may be circumferentially arranged. The side 14 (herein referred to as the "peripheral side" of the member) of each member 6 disposed at the periphery of plate 8 may be curved so that the plurality of members together presents a generally circular peripheral surface. The members are operatively associated with the plate by any suitable configuration which permits movement, preferably radial movement, of the members. Each member 6 may be a solid piece, but preferably is hollow with an open bottom side and a top side which includes openings which define a segment 16. The segment 16 defines a slot 18. Screws 20 disposed in slot 18 couple each member to plate whereby the members are free to move radially along the track defined by the slot. The members may move independently of one another. The number of members ranges for example from 4 to 14, and preferably from 6 to 10. The members may be molded segments and are fabricated from any suitable material such as a metal or plastic. A preferred class of materials are high temperature and low mass polymeric materials such as TEFLON™ (i.e., tetrafluoroethylene), ULTEM 1000™ (polyetherimide) available from General Electric Company, TORLON™ (polyamideimide) available from Amoco Chemicals, and VALOX FV-608™ (polyester) available from General Electric Company. In embodiments, the members may be made from metallic or polymeric composite honey comb.

The plate 8 may be circular and may define a plurality of openings. The plate may be fabricated from any suitable material including a metal like steel or aluminum.

The housing 10, which encloses a substantial part of means 12, may define a plurality of openings and may be coupled to the plate 8. The housing may be fabricated from any suitable material including a metal like steel or aluminum.

Means 12 may comprise for example a vertically movable rod 21 including a conically-shaped end portion 22, wherein the conically-shaped end portion may be operatively associated with the plurality of the members 6. The end of the rod 21 may be coupled to a spring assembly 24 comprised of spring 26 and activator member 28. The spring 26 contacts the housing 10. The members 6 may be circumferentially arranged around the the conically-shaped end portion 22, whereby the radially inward force exerted by the membrane 4 urges the members against the conically-shaped end portion. The members may have a blunt, curved tip to facilitate contact with the conically-shaped end portion. The means 12 may be fabricated of any suitable material including metal or plastic.

The elastic membrane 4 may comprise for example a disk portion 30 and an integral side portion 32 formed around the periphery of the disk portion. The end of the side portion may include a flange (not shown). The side portion constitutes in embodiments the substrate engaging portion of the membrane. The inner surface of the membrane defines an interior space 34. The membrane is slipped over the members so that the optional flange may engage an optional circumferential gap 36 between the plate 8 and the members 6. The membrane is dimensioned to provide a radially inward force on the members. The members are partially or entirely disposed in the interior space 34 of the membrane. The side portion 32 of the membrane covers at least a part of the peripheral side 14 of the members ranging for example about 50% to 100% of the height of the peripheral side. The membrane has the following chacteristics: fluid impermeability; a thickness ranging for example from about 0.4 mm to about 15 mm, and preferably from about 0.7 mm to about 3 mm; and a durometer value ranging for example from about 20 to about 90, and preferably from about 30 to about 60. The membrane may be fabricated from any suitable material including for instance silicone, such as silicone rubber compound no. 88201 available from Garlock Corporation, and flexible/elastic high temperature elastomers such as VITON™ and ZETPOL 2000™ (hydrogenated nitrile elastomer—HNBr).

The elastic membrane may serve several functions. First, the membrane may provide a radially inward force on the members. Second, the membrane may provide in embodiments a hermetic seal when the chuck assembly is engaged with the substrate. Third, the membrane provides a "thermal break," i.e., function as a heat insulator, during heating of the substrate in a processing step.

Operation of the embodiment depicted in FIGS. 1–2 proceeds as follows. The embodiment shown in FIG. 1 illustrates the radially expanded position of the members, whereby the chuck assembly 2 has the maximum width. Prior to engagement of the chuck assembly with a substrate, the activator member 28 is depressed which pushes the coupled rod 21 and the conically-shaped end portion 22 downwards and compresses the spring 26. As the conically-shaped end portion moves downward, the members 6, urged on by the radially inward force exerted by the elastic membrane 4, are able to move inward since the taper of the conically-shaped end portion presents a decreased cross-sectional dimension. Radially inward movement of the members results in a decrease in the peripheral dimension of the assembly of the members and of the elastic membrane such that the width of the chuck assembly is less than that of the inner dimension of the substrate. The portion of the chuck assembly including the members and the membrane is inserted into the hollow substrate. Preferably, the substrate is positioned on its end and the chuck assembly moves vertically downward into the substrate. For the chuck assembly to engage the substrate, pressure on the activator member 28 is decreased whereby the compressed spring 26 expands, thereby pushing up the activator member, the rod 21, and the conically-shaped end portion 22. Movement upwards of the conically-shaped end portion pushes radially outward the members since the taper of the conically-shaped end portion presents an increased cross-sectional dimension.

It is preferred that radial movement of the members, whether inwardly or outwardly, occur generally simultaneously and substantially uniformly. Movement of the members radially outwards increases the peripheral dimension of the assembly of the members and of the membrane, whereby the peripheral side of the members push the membrane against the inner surface of the substrate. Typically only the membrane, especially the side portion 32, may contact the substrate inner surface. However, in embodiments of the instant invention, an uncovered portion of the peripheral side of the members may also contact the substrate inner surface. After processing of the substrate, the activator member is depressed to shrink the width of the chuck assembly, thereby allowing withdrawal of the chuck assembly from the substrate.

During engagement of the chuck assembly with the substrate, it is preferred that a hermetic seal is created by contact of the membrane against the substrate inner surface to minimize or prevent fluid migration, especially liquid, into the interior of the substrate.

Any suitable rigid or flexible substrate may be held by the substrate holding apparatus of the present invention. The substrate may have a cylindrical cross-sectional shape or a noncylindrical cross-sectional shape such as an oval shape. The substrate may be at least partially hollow, and preferably entirely hollow, with one or both ends being open. In preferred embodiments, the substrate is involved in the fabrication of photoreceptors and may be bare or coated with layers such as photosensitive layers typically found in photoreceptors. The substrate may have any suitable dimensions. An advantage of the chuck assembly in embodiments is that it embodies low mass and therefore may not cause excessive heat flow from a thin substrate to the chuck assembly when placed in an oven.

Figure 3:
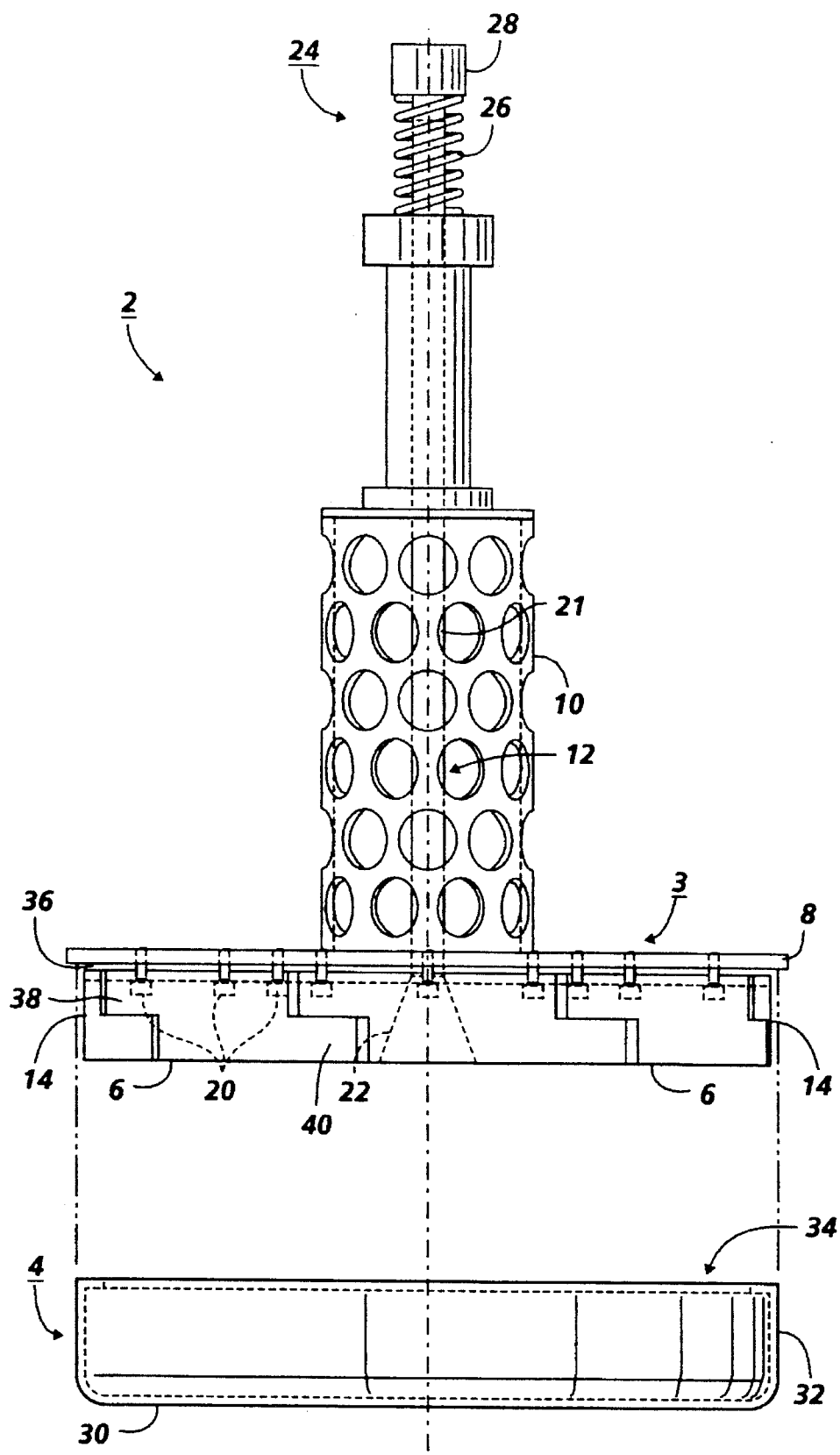
FIG. 3 represents a schematic, side view of another embodiment of the chuck assembly comprised of the chuck and the elastic membrane.
Figure 4:
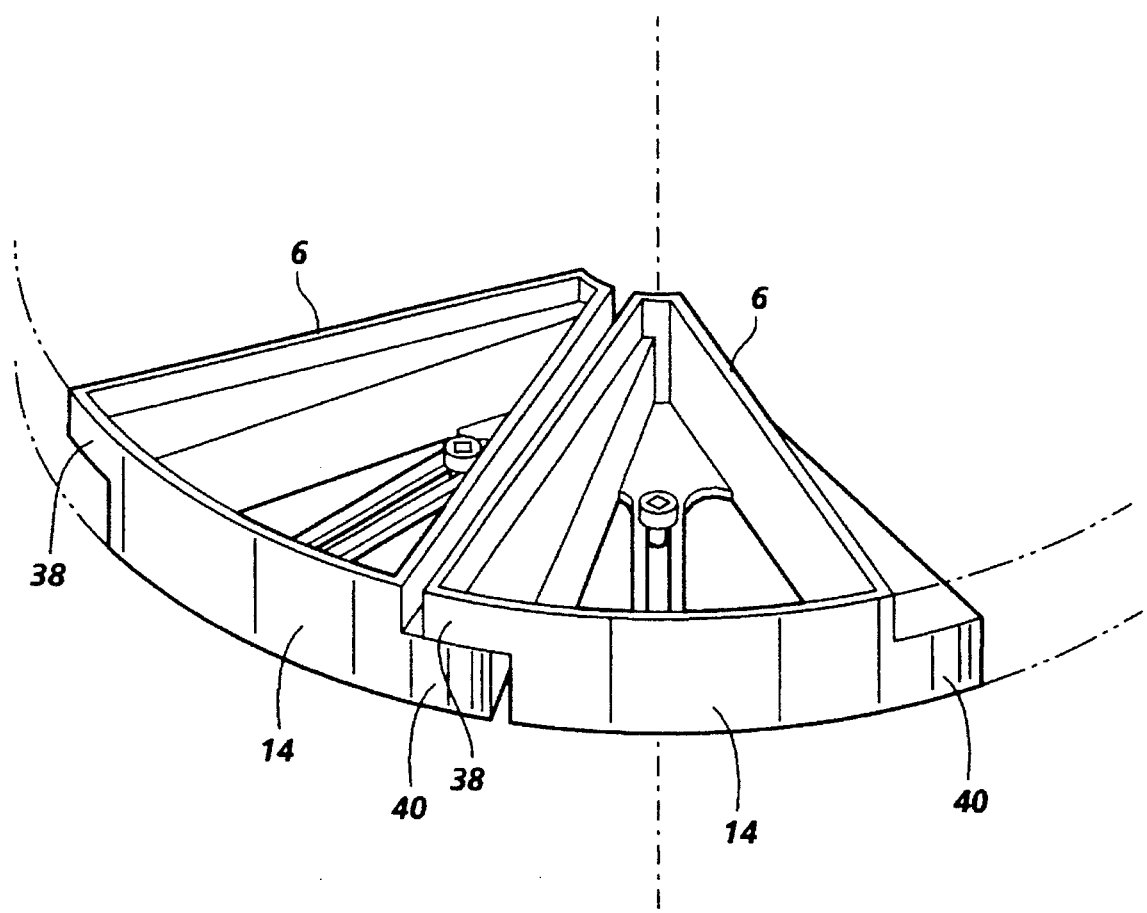
FIG. 4 represents a partial, perspective view of adjoining members of the chuck depicted in FIG. 3.

FIGS. 3 and 4 illustrate another embodiment of the instant invention where adjoining members 6 overlap and contact one another in the overlapping area. Each member 6 may include both an integral overlying portion 38 and an integral underlying portion 40 whereby the overlying portion 38 of each member overlaps and contacts the underlying portion 40 of the adjoining member. The overlaying portion and the underlying portion of each member preferably extend along the entire length of the member. In this embodiment, the contact surfaces of the members may be optionally coated with a layer of a low friction material such as TEFLON™ to minimize any friction which may inhibit the radial movement of the members. This configuration of FIGS. 3–4 is advantageous when the diameter of the substrate is large which may necessitate larger gaps between members 6 or when a low durometer membrane is utilized. Large gaps between members and/or a low durometer membrane may in some instances result in loss of the hermetic seal in the embodiment of FIGS. 1–2 due to the loss in compression of the membrane across the gap (i.e., if the membrane recedes into the gap between adjacent members). The embodiment illustrated in FIGS. 3–4 and similar embodiments minimize or eliminate the possibility of a loss of the hermetic seal by having adjacent members overlap and contact one another in the overlapping area, thereby bridging or closing the gap. Operation of the chuck assembly depicted in FIGS. 3–4 proceeds in the same manner as for the embodiment illustrated in FIGS. 1–2 discussed above.

In additional embodiments of the invention, the circumferential surface of the chuck defined by the peripheral sides 14 of the members has a groove (not shown). A coil spring (not shown) is present in the groove so that the coil encircles the circumferential surface of the chuck. The coil may exert an inwardly radially force.

In other embodiments, each member is coupled to the same or different internally disposed spring (not shown) to exert an inwardly radially force on the members.

Other modifications of the present invention may occur to those skilled in the art based upon a reading of the present disclosure and these modifications are intended to be included within the scope of the present invention.

We claim:

1. A chuck assembly for engaging an inner surface of a hollow substrate comprising:
   (a) a fluid impermeable elastic membrane including a substrate engaging portion, wherein an inner surface of the membrane defines an interior space, and wherein the membrane is adapted to form a hermetic seal when engaged with the substrate inner surface; and
   (b) a plurality of radially movable members at least partially disposed in the interior space, wherein the membrane is dimensioned to provide a radially inward force on the members, wherein the members in a radially expanded position push the substrate engaging portion of the membrane against the substrate inner surface, and wherein the peripheral dimension of the elastic membrane decreases when the members are in a radially contracted position, and wherein engagement of the membrane against the substrate inner surface results in the hermetic seal which minimizes fluid migration into the substrate interior.

2. The chuck assembly of claim 1, further comprising:
   (c) means, operatively associated with the plurality of the members, for moving substantially simultaneously the plurality of the members into the radially expanded position.

3. The chuck assembly of claim 2, wherein the means comprises a rod including a conically-shaped end portion.

4. The chuck assembly of claim 1, wherein in the absence of a radially outward force on the members, the radially inward force on the members exerted by the membrane contracts the members into the radially contracted position.

5. The chuck assembly of claim 1, wherein the members are entirely disposed in the interior space.

6. The chuck assembly of claim 1, further comprising a vertically movable rod including a conically-shaped end portion, wherein the members are circumferentially arranged around and are operatively associated with the conically-shaped end portion.

7. The chuck assembly of claim 1, wherein the members are circumferentially arranged.

8. The chuck assembly of claim 1, wherein the number of members ranges from 6 to 10.

9. The chuck assembly of claim 1, wherein the members are triangularly-shaped.

10. The chuck assembly of claim 1, wherein each member is hollow and defines an open bottom side.

11. A chuck assembly for engaging an inner surface of a hollow substrate comprising:
    (a) a fluid impermeable elastic membrane including a substrate engaging portion, wherein an inner surface of the membrane defines an interior space, and wherein the membrane is adapted to form a hermetic seal when engaged with the substrate inner surface; and
    (b) a plurality of circumferentially arranged and radially movable members at least partially disposed in the interior space, wherein adjoining members overlap and contact one another in an overlapping area, wherein the membrane is dimensioned to provide a radially inward force on the members, wherein the members in a radially expanded position push the substrate engaging portion of the membrane against the substrate inner surface, and wherein the peripheral dimension of the elastic membrane decreases when the members are in a radially contracted position, and wherein engagement of the membrane against the substrate inner surface results in the hermetic seal which minimizes fluid migration into the substrate interior.

12. The chuck assembly of claim 11, wherein each member includes an overlying portion and an underlying portion whereby the overlying portion of each member overlaps and contacts the underlying portion of the adjoining member.

* * * * *